UNITED STATES PATENT OFFICE.

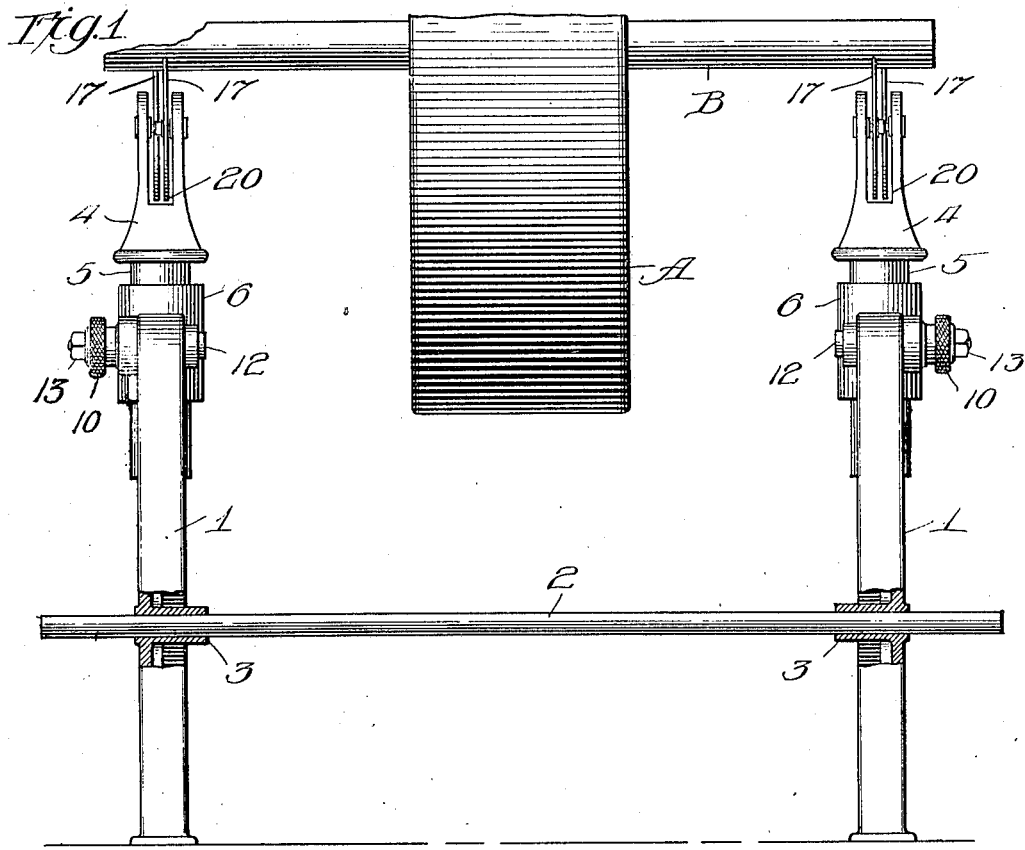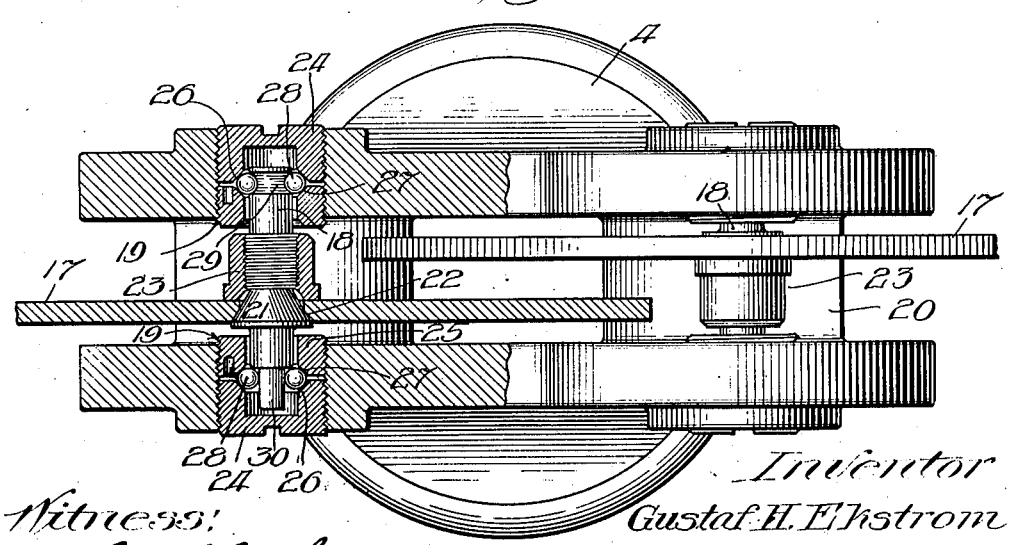

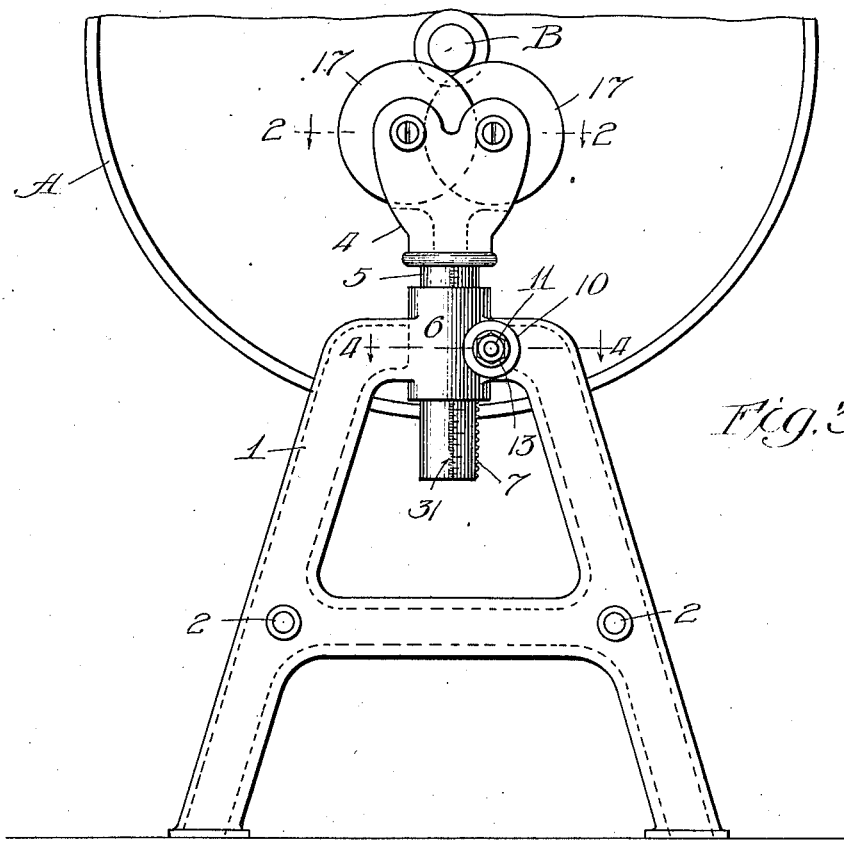
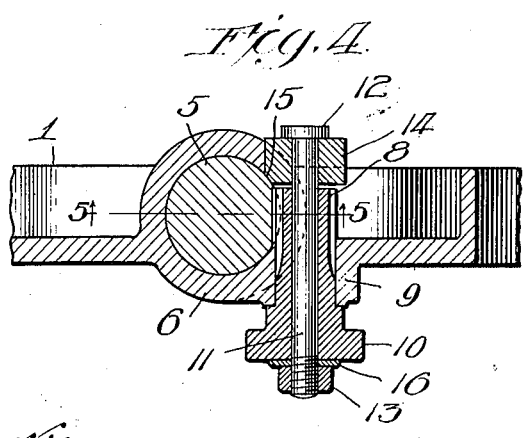
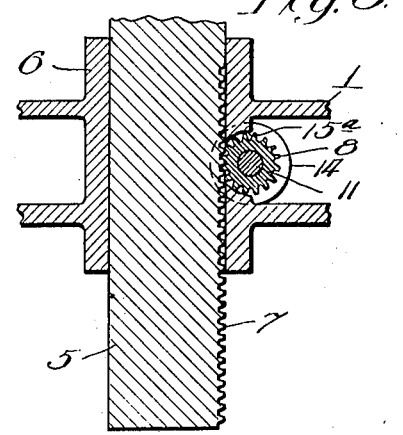

GUSTAF H. EKSTROM, OF ROCKFORD, ILLINOIS, ASSIGNOR TO ROCKFORD TOOL COMPANY, OF ROCKFORD, ILLINOIS, A CORPORATION OF ILLINOIS.

BALANCING-STAND.

1,292,280.   Specification of Letters Patent.   Patented Jan. 21, 1919.

Application filed February 16, 1918. Serial No. 217,482.

*To all whom it may concern:*

Be it known that I, GUSTAF H. EKSTROM, a citizen of the United States, residing at Rockford, in the county of Winnebago and State of Illinois, have invented certain new and useful Improvements in Balancing-Stands, of which the following is a specification.

This invention relates to stands by means of which a pulley or the like may be supported for free rotation in order that the location of unbalanced metal in the pulley may be determined; and one object of the invention is to provide a balancing stand of improved construction and arrangement by means of which it is possible to test a part for balance with a great degree of accuracy.

Another object of the invention is to produce a balancing stand which may be easily adjusted for the purpose of accommodating pulleys of various sizes to be tested for balance, and for the purpose of accurately leveling the shaft on which the pulley is mounted.

In the accompanying drawings, Figure 1 is a fragmental side elevation of a balancing stand embodying the features of my invention. Fig. 2 is an enlarged plan view with certain parts sectioned off on the plane of dotted line 2 of Fig. 3. Fig. 3 is an end elevation. Fig. 4 is a horizontal sectional view taken in the plane of dotted line 4—4 of Fig. 3. Fig. 5 is a sectional view taken in the plane of dotted line 5—5 of Fig. 4.

In the drawings, A denotes a pulley which is to be tested for balance and B is a shaft on which said pulley is mounted in order that the pulley may be rotatably supported upon the stand.

The stand comprises two standards 1 having feet adapted to rest upon a bench or other suitable support. The standards 1 are connected together and maintained in vertical position by suitable means, as, for example, two rods 2 slidably extending through apertured bosses 3 on the standards. It will be seen that the standards 1 may be placed at varying distances apart to correspond with variations in the size of the parts operated upon.

Each standard 1 is provided at its upper end with a head 4 arranged to support one end of the shaft B, and one or both of said heads are mounted in the standards for vertical adjustment. For this purpose each head is herein shown as provided with a stem 5 which is vertically slidable in a bearing 6 provided at the upper end of the standard. In one side of the stem 5 are formed rack teeth 7 that mesh with a pinion 8 which is rotatably mounted in a bearing 9 on the standard. The pinion 8 is provided with a knurled flange or head 10 by means of which the pinion may be turned to raise and lower the stem. To secure the stem in adjusted position a clamping bolt 11 having a head 12 on one end and a nut 13 on the other end extends through an axial opening in the pinion 8 and is arranged to clamp a bushing 14 against the stem 5. Said bushing is carried by the bolt 11 between the head 12 and pinion 8 and is provided with a beveled surface 15 adapted to lie in contact with the surface of the stem 5, the bearing 6 being cut away as at 15$^a$ (Fig. 5) for this purpose. It will be apparent that when the head 4 has been adjusted to the desired height by turning the knurled head 10 of the pinion it may be readily fixed against movement in its bearing 6 by tightening the nut 13 of the clamping bolt so as to draw the bushing into binding engagement with the stem 5. 16 is a washer between the nut 13 and the knurled head 10 of the pinion.

In order that the shaft B and pulley A thereon may revolve with the utmost freedom, the heads 4 are each provided with anti-friction means comprising a pair of rollers 17 fixed upon spindles 18 and roller bearings 19 for said spindles carried by the head 4. The anti-friction rollers are preferably in the form of flat disks and are arranged to operate in a channel groove 20 formed longitudinally of the head 4. The rollers 7 operate in a plane transversely of the shaft B, and the spindles 18 upon which the rollers are mounted extend transversely of the head and are spaced apart so as to enable the rollers to support the shaft B between them on their peripheries.

For the purpose of securing the rollers 17 to their spindles a tapered collar 21 is provided on each spindle and the roller is provided with a central tapering opening 22 to receive the collar 21. A nut 23 threaded on the spindle is arranged to clamp the roller upon the collar 21 and hold it against rotation.

The roller bearings 19 are provided for the opposite ends of the spindles and are mounted in the head at opposite sides of the channel groove 20 therein. Each of said bearings comprises two members 24 and 25 having screw-threaded connection with the head and having at their adjacent ends tapered surfaces or ball races 26 and 27, respectively, for bearing balls 28. At one end the spindles are provided with an annular groove 29 in which the balls 28 of the bearings at one side of the head are arranged to travel, while at the other end, for convenience in assembling the parts, the spindles are provided with a reduced portion 30 for receiving the bearing balls.

It will be evident that the antifrictional means thus provided for supporting the shaft B permits of the making of a very accurate test of a pulley or the like for unbalanced metal and by reason of the adjustability of the stand it is possible to quickly and easily position thereon parts varying substantially in size. To facilitate the adjusting of the heads 4 on the standards so as to support the shaft in horizontal position a graduated scale may be provided on each of the stems 5 as at 31 (Fig. 3) for gaging the position of the stem with reference to its bearing 6.

I claim as my invention:

1. A balancing stand having, in combination, an upright standard, a head having a stem mounted in said standard for vertical movement, a rack on said stem, a pinion in said standard meshing with the rack and arranged to be rotated to vary the height of the head, a bushing having a surface adapted to lie in contact with the stem, a clamping bolt entered through said pinion and said bushing for drawing the bushing into clamping engagement with the stem, and means on the head for supporting one end of the work to be balanced.

2. A balancing stand having, in combination, an upright standard, a head on the standard having a stem mounted in the standard, a rack and pinion connection between the stem and standard, whereby the stem may be adjusted vertically in the standard, means for locking said stem in adjusted position, and means carried by the head for supporting one end of the work to be balanced.

3. A balancing stand having, in combination, an upright standard, a head mounted on the standard and having a channel groove, a pair of disk rollers arranged to operate in said groove and each mounted on a spindle, and roller bearings supported in said head at each side of the groove for the opposite ends of said spindles, said spindles being spaced apart so as to enable their rollers to support between them one end of the work to be balanced.

4. A balancing stand having, in combination, a pair of standards connected together in upright position, a head on the upper end of one of said standards having a stem mounted in the standard for vertical adjustment, and means carried by said head and the upper end of the other standard for rotatively supporting the work to be balanced.

5. A balancing stand having, in combination, a pair of standards, a rod connecting the standards together for horizontal adjustment and maintaining the standards in upright position, a head carried by the upper end of each standard, at least one of said heads being vertically adjustable, and means carried by the heads for rotatively supporting the work to be balanced.

In testimony whereof I have hereunto set my hand.

GUSTAF H. EKSTROM.